May 16, 1967   A. R. BIEDESS   3,319,770
MATERIAL TRANSFER ASSEMBLY FOR CASCADE CONVEYORS
Filed Oct. 22, 1965   3 Sheets-Sheet 2
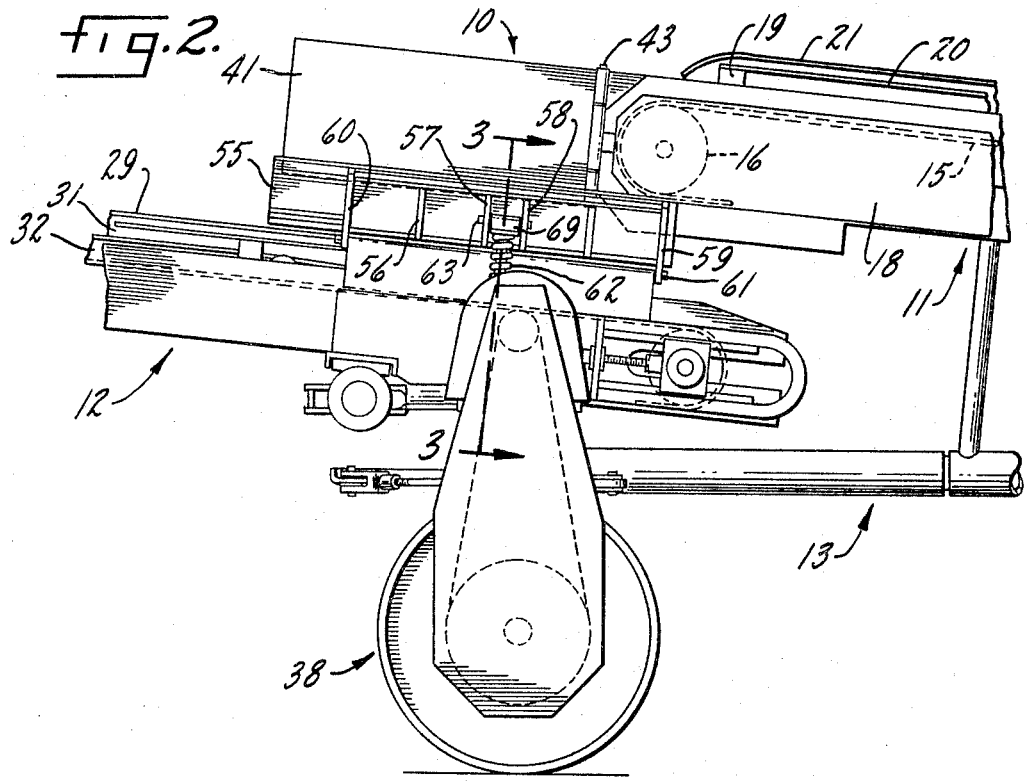
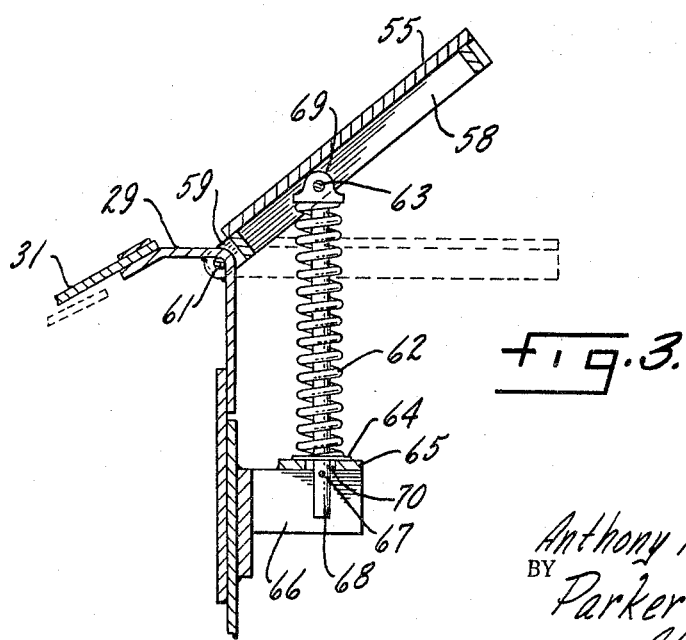
INVENTOR.
Anthony R. Biedess,
BY Parker & Carter
Attorneys.

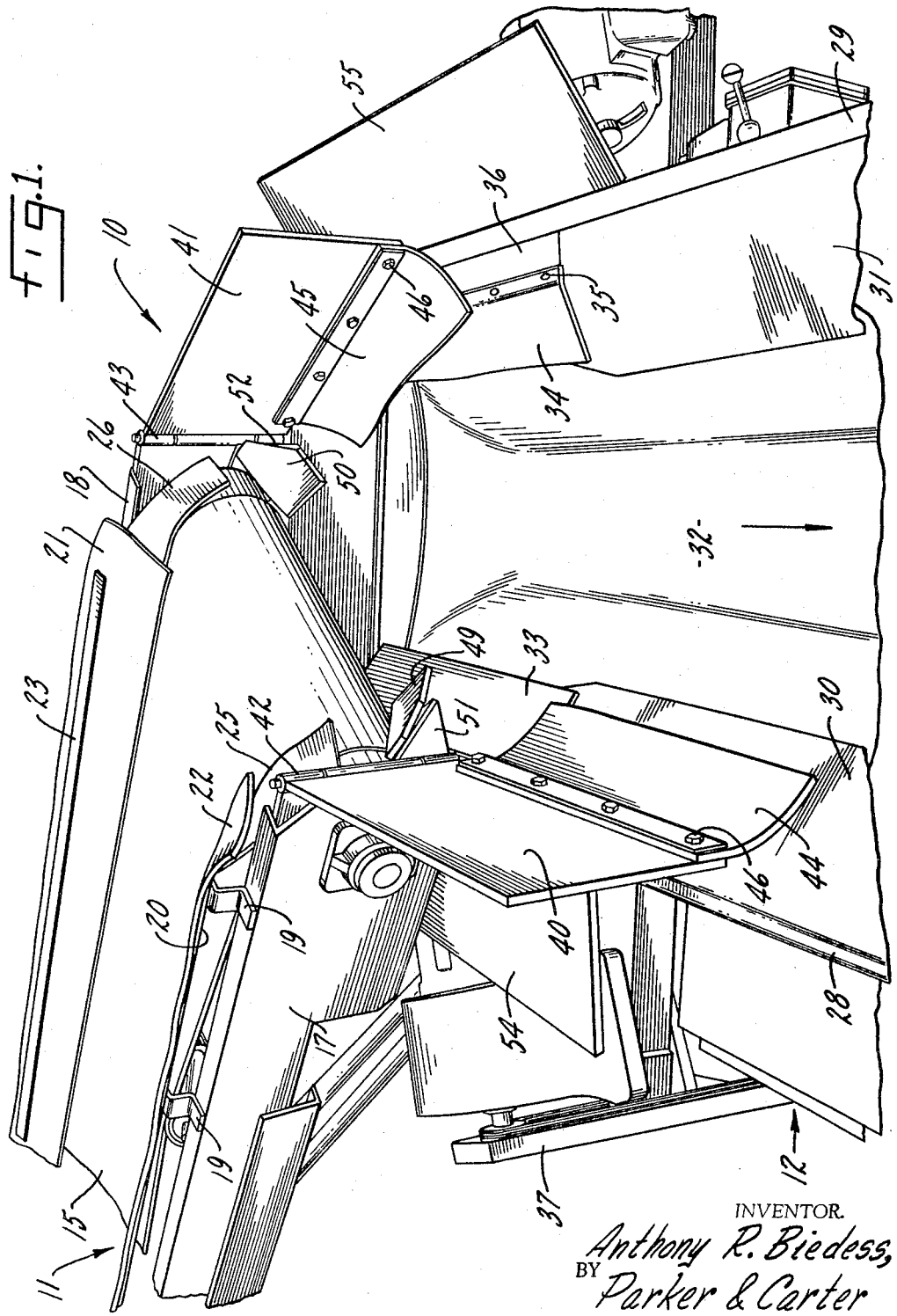

Figure 4:
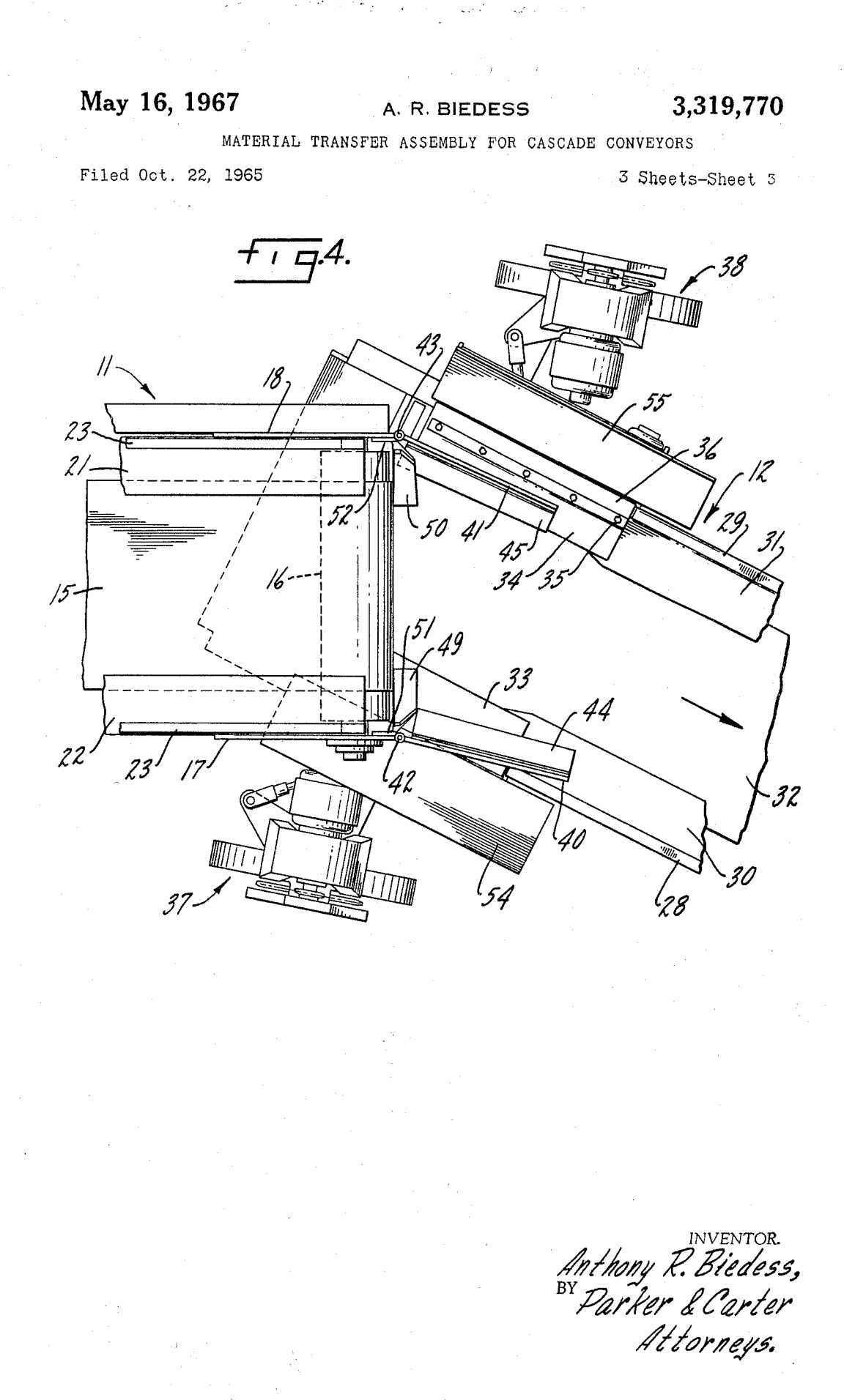

May 16, 1967 A. R. BIEDESS 3,319,770
MATERIAL TRANSFER ASSEMBLY FOR CASCADE CONVEYORS
Filed Oct. 22, 1965 3 Sheets-Sheet 3 fig.4.

INVENTOR.
Anthony R. Biedess,
BY Parker & Carter
Attorneys.

3,319,770
MATERIAL TRANSFER ASSEMBLY FOR CASCADE CONVEYORS

Anthony R. Biedess, Chicago, Ill., assignor to Westinghouse Air Brake Company, Pittsburgh, Pa., a corporation of Pennsylvania
Filed Oct. 22, 1965, Ser. No. 501,408
10 Claims. (Cl. 198—160)

This invention relates generally to transfer mechanisms and specifically to means for confining and directing material carried by one conveyor onto another conveyor disposed at an angle thereto. Although the invention will be applicable to the general environment discussed above it has been found especially useful in connection with a conveyor of the type illustrated in co-pending application Ser. No. 419,114, assigned to the assignee of the present application, to which reference is made for a more complete description of the conveyor.

The problem of efficient transfer of conveyed material from one conveyor to another which are disposed at different elevations and at an angle to one another may be solved by constructing a surge bin or hopper at the tail end of the receiving conveyor, the surge bin or hopper having a capacity sufficient to handle surge loads discharged thereinto by the discharging conveyor. A conventional surge bin or hopper includes rigid, upwardly extending sides and therefore the upstream conveyor must be elevated a distance sufficient to clear the hopper sides of the downstream, material receiving conveyor. This arrangement has the disadvantage that the length of fall of the conveyed material is considerably increased and consequently the receiving conveyor belt may be subjected to excessive impact. Furthermore, the use of a rigid upwardly extending surge hopper may not be practical in certain applications, such as underground coal mines, because of the increased head room required thereby.

Accordingly the primary object of this invention is to provide means for transferring conveyed material from one conveying level to another with minimum impact and which requires no additional vertical clearance.

Yet another object is to provide a transfer mechanism which performs the function of a surge bin or hopper without requiring the vertical clearance normally associated therewith.

Another object is to provide a surge bin or hopper for confining and directing material carried by one conveyor onto another conveyor disposed at any one of a plurality of angles with respect to the path of movement of the material on the first conveyor.

A further object is to provide a surge bin or hopper as above described, the capacity of which is variable in consonance with the position of the conveyors with respect to one another.

Yet another object is to provide a surge bin or hopper as above described having components carried by each of two adjacent conveyors, the components being arranged to shift their relative positions with respect to one another in consonance with relative movement between the two conveyors.

Yet a further object is to provide a surge bin or hopper as above described in which the change in shape and capacity of the surge bin in consonance with change of position of the conveyors relative to one another is accomplished without the use of auxiliary power means.

A further object is to provide a sinuous multi unit conveyor having a first conveyor carried by a first unit which discharges onto a second conveyor carried by a second unit and wherein the two units form therebetween a combination material surge hopper and direction transfer structure, the size and orientation of which is dependent on the relative angularity between the conveyor units, the longer side of which is always located in the area of greatest material accumulation.

Other objects and advantages of the invention will become apparent from a reading of the following description.

The invention is illustrated more or less diagrammatically in the accompanying figures, wherein:

FIGURE 1 is a perspective view illustrating the invention as applied to the transfer area between a pair of conveyors which are disposed at an angle to one another;

FIGURE 2 is a side elevational view of the transfer area between the two conveyors illustrated in FIGURE 1 when said conveyors are aligned with one another;

FIGURE 3 is a view taken substantially along the line 3—3 of FIGURE 2; and

FIGURE 4 is a top plan view similar to FIGURE 1 illustrating the overlapping relationship of parts when the conveyors are disposed at an angle intermediate the angles of FIGURES 1 and 2.

Like reference numerals will be used to refer to like parts throughout the following description of the figures.

A portion of a multi unit conveyor of the type illustrated in co-pending application Ser. No. 419,114 is indicated generally at 10 in FIGURE 1. The conveyor comprises a first conveyor unit 11 and a second conveyor unit 12, the conveyor units being secured to one another by structure indicated generally at 13 in FIGURE 2. Since the particular mechanism by which one conveyor unit is connected to another does not by itself form an essential part of the invention it is not further described herein. Reference to the aforesaid co-pending application will indicate one arrangement which may be utilized with the present invention.

The first conveyor unit 11 includes a flexible conveyor belt 15 which is preferably formed from rubber, nylon or other material having the characteristics with respect to flexure and compressibility of rubber or nylon. Belt 15 passes around an end pulley 16 which is rotatably supported at its end portions in side-frame members 17 and 18 of the main frame structure of conveyor unit 11. A plurality of brackets 19 and base strips 20 form an attachment base for rubber deflectors 21, 22 which are clamped to the base strips by metal anchor strips 23 bolted into the base strips. Base strips 20 are welded or otherwise suitably secured to the anchor brackets 19.

A pair of rubber pulley guards are indicated at 25, 26, the purpose of which is to help deflect conveyed material discharged over the end of belt 15 toward the center of the conveyor positioned therebelow, as well as to protect the pulley 16.

Conveyor unit 12 is of substantially identical construction. Said unit includes sideframe members 28, 29 to which the flexible depending skirts 30, 31 are secured by any suitable means. Skirts 30, 31 extend downwardly to the upper surface of conveyor belt 32 which moves in the direction of the arrow of FIGURES 1 and 4. Another pair of deflectors 33, 34 are located adjacent the head end of conveyor 12 and are secured by any suitable means such as bolts 35 to extension plates 36 carried by sideframes 28, 29.

As best seen in FIGURES 2 and 4 the head end of conveyor unit 11 is fastened to a connecting mechanism carried by the tail end of unit 12. A pair of wheels 37, 38 are carried by the tail end of front conveyor unit 12, the wheels serving to support the head or discharge end of rear conveyor unit 11 as well.

The variable capacity and configuration surge hopper assembly of this invention includes a pair of primary impact plates or walls 40, 41 which are pivoted, at their inner ends, to the forward edges of sideframe members 17 and 18 at 42 and 43 respectively. Each plate is pivoted about a generally vertical axis and is free to swing loosely thereabout, although a light spring may be provided if desired. Each impact plate carries a rubber shield or deflector at its lower edge portion, the shields 44, 45 being secured to the plates by any suitable means such as a bolt and clamp strip arrangement 46. It will be noted that shield 44 overlies skirt 30 throughout substantially its entire length, whereas shield 45 overlies inner deflector 34 when the conveyors are in the position of FIGURE 1. When the conveyor units 11 and 12 are aligned with one another shields 44, 45 do not extend much, if any, beyond deflectors 33, 34. In all positions however a substantially continuous material deflecting and confining surface is provided so there is no opportunity for conveyed material to find its way about or around the relatively movable parts.

A pair of side deflectors are indicated at 49, 50, these deflectors being secured, as by welding, to projections extending from the forward edge of the sideframe members 17 and 18 respectively. A pair of abutment members are indicated at 51 and 52 respectively, the purpose of which is to prevent impact plates 40 and 41 from swinging so far inwardly that said plates could rub against the conveyor belt 15, or bind against one another.

A second set of surge hopper walls are indicated at 54 and 55 respectively. Each of these auxiliary walls consist essentially of a rectangular plate having a plurality of reinforcing ribs 56, 57, 58, 59 and 60 formed on the rear surface thereof. The terminal ribs 59 and 60 extend downwardly beneath the lower edge of wall 55, as seen best in FIGURE 3, and are apertured to receive a pivot shaft 61 carried by sideframe member 29. A spring 62 is pivotally connected by pin 63 to the underside of auxiliary wall 55. The lower end of the spring bottoms against a washer 64 mounted on plate 65 which in turn is welded to bracket 66 which in turn is welded to the side 29 of the frame. A cotter pin 67 which passes through a shaft 68 located inside the spring prevents upward displacement of the spring since the pin passes beneath plate 65. Shaft 68 terminates in a fixture 69 which is apertured to receive the pivot pin 63. As can best be seen in FIGURE 3 the aperture 70 in plate 65 is larger than the diameter of shaft 68 to provide a loose restraint to the bottom end of the spring 62.

Auxiliary plates 54 and 55 are so positioned that when the conveyor units are disposed at a substantial angle to one another, as they are in FIGURE 1, the lower edge of the appropriate side of the rearmost conveyor unit will force the associated auxiliary plate downward against the bias of spring 62. The auxiliary plate is thereby removed from the system and at the same time the opposite auxiliary plate, in this instance plate 55, will be unaffected and will provide an extension of the surge hopper, the initial portion of which is formed by impact plate 41.

The use and operation of the invention is as follows:

When conveyor units 11 and 12 are aligned with another so that the flow of material is substantially linear from one end of the conveyor to the other the parts will be disposed in substantially their FIGURE 2 position. In this condition the impact plates 40, 41 will be substantially coextensive with the auxiliary side plates 54, 55, and the auxiliary side plates will be in their FIGURE 3 position. The auxiliary plates perform no material confining or deflecting function in this position but this is acceptable since there is little need for additional hopper space when the units are aligned with one another.

When the conveyor units 11 and 12 are disposed at an angle to one another, as in FIGURE 1 or 4, the auxiliary plate closest to its associated rear conveyor unit sideframe will be depressed or collapsed downwardly toward a generally horizontal position and thereby effectively removed from the system. At the same time, the impact plate on the opposite side of the conveyor, here impact plate 41, will be disposed rearwardly with respect to its associated auxiliary plate 55 and these two plates will in effect form the working side of a surge hopper, the length of which is greater than the length of impact plate 41. The exact length of the hopper is dependent upon the angle between conveyor units 11 and 12. Since the outside of the curve is the area in which the conveyed material tends to pile up, it is this side of the curve on which the greatest length is needed. It will be observed that the long side of the surge hopper will always be located on that side of the curve against which the bulk of the material will tend to pile up.

Although a preferred embodiment of the invention has been illustrated and described it will at once be apparent to those skilled in the art that various modifications may be made without departing from the spirit of the invention. Accordingly the scope of the invention is intended to be limited solely by the scope of the hereinafter appended claims.

I claim:

1. Apparatus for the transfer area between adjacent conveyors which are disposed in discharging relationship one to the other, said apparatus including
    impact wall means carried by a first conveyor and arranged in generally vertical material confining condition in all relative positions of the conveyors to one another,
    auxiliary wall means carried by a second conveyor,
    said auxiliary wall means comprising a first and second wall structure disposed, respectively, on the first and second sides of the second conveyor,
    means for collapsing the auxiliary wall structure toward a horizontal position on the side of the second conveyor toward which the first conveyor is laterally disposed out of operative position when the conveyors are disposed at an angle substantially less than 180° with respect to another, and
    means for maintaining the remaining auxiliary wall structure in operative position so long as the other auxiliary wall structure is out of operative position.

2. The apparatus of claim 1 further characterized in that the means for collapsing each auxiliary wall structure to an inoperative position or maintaining it in an operative position includes
    pivot means for each of the auxiliary wall structures which enables each auxiliary wall structure to collapse toward a generally horizontal position to swing out of the path of the first conveyor in response to engagement therewith, and
    spring means for each auxiliary wall structure effective to urge each auxiliary wall structure into an operative position when the first conveyor is out of collapsing engagement therewith.

3. The apparatus of claim 1 further characterized in that the impact wall means includes
    a pair of impact walls, each of said pair being pivoted about a generally vertical axis on an associated side of the first conveyor,
    said impact walls being carried by the first conveyor and being disposed laterally between the first and second wall structures.

4. The apparatus of claim 3 further including
    abutment means for limiting the inward swing of the impact walls to a point at which binding would occur.

5. The apparatus of claim 3 further including
    a pair of fixed deflectors, one deflector associated with each of the impact walls and arranged to intercept material discharged from the first conveyor and into the area upstream from its associated impact wall, and deflect the intercepted material toward the second conveyor.

6. The apparatus of claim 5 further characterized in that each impact wall carries a flexible skirt at its lower edge portion which extends downwardly a distance sufficient to form a continuous material confining structure from the second conveyor upwardly a distance sufficient to accommodate surge loads.

7. The apparatus of claim 6 further characterized in that the deflectors are so positioned that when a deflector and its associated skirt are in vertically overlapping operating relationship the skirt will pass freely beneath the deflector.

8. The apparatus of claim 2 further characterized in that
the spring means for each auxiliary wall structure is a spring having one end pivotally connected to the auxiliary wall structure and its other end carried by the second conveyor,
said spring being biased to maintain its associated auxiliary wall structure in a position inclined from the vertical.

9. The apparatus of claim 8 further characterized in that the frame of the first conveyor is constructed and arranged to depress whichever auxiliary wall structure it comes in contact with when the second conveyor is disposed at an angle with respect to the first conveyor.

10. Apparatus for the transfer area between successively, articulatively adjustable conveyors which are disposed in cascade relationship with one positioned to discharge onto the other including:
impact wall means including a pair of laterally spaced substantially vertical walls extending from a first one of said conveyors and arranged in generally vertical, material-confining condition over a second one of said conveyors throughout a range of articulated positions of the conveyors;
auxiliary wall means carried by said second conveyor and comprising a pair of laterally spaced auxiliary walls arranged on the second conveyor, each auxiliary wall being movable to and from a generally upright material-confining position to supplement the material-confining condition of the impact wall means;
and means responsive to bending of said conveyors to a non-linear position for moving the auxiliary wall on the inside of the bend toward an inoperative, generally horizontal position, out of the way of the second conveyor, while maintaining the auxiliary wall on the outside of the bend in its said material-confining position.

References Cited by the Examiner
UNITED STATES PATENTS
2,805,761   9/1957   Stroh _____ 198—97

EVON C. BLUNK, *Primary Examiner.*

EDWARD A. SROKA, *Examiner.*